United States Patent
Kim et al.

(10) Patent No.: US 11,585,584 B2
(45) Date of Patent: Feb. 21, 2023

(54) REFRIGERATOR AND CONTROL METHOD THEREOF

(71) Applicant: LG Electronics Inc., Seoul (KR)

(72) Inventors: Yonghyun Kim, Seoul (KR); Siyeon An, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/368,178

(22) Filed: Jul. 6, 2021

(65) Prior Publication Data

US 2021/0333034 A1   Oct. 28, 2021

Related U.S. Application Data

(63) Continuation of application No. 16/288,745, filed on Feb. 28, 2019, now Pat. No. 11,079,155.

(30) Foreign Application Priority Data

Feb. 28, 2018   (KR) .................. 10-2018-0024696

(51) Int. Cl.
*F25C 5/185*   (2018.01)
*F25C 1/04*   (2018.01)
(Continued)

(52) U.S. Cl.
CPC ............... *F25C 5/185* (2013.01); *F25C 1/04* (2013.01); *F25C 5/187* (2013.01); *F25D 11/02* (2013.01);
(Continued)

(58) Field of Classification Search
CPC .. F25C 5/185; F25C 5/187; F25C 1/04; F25C 2700/02; F25C 2400/10; F25C 2600/04;
(Continued)

(56) References Cited

U.S. PATENT DOCUMENTS

2005/0076654 A1*   4/2005   Chung .................. F25D 17/065
                                                       62/190
2008/0022703 A1     1/2008   Cook et al.
(Continued)

FOREIGN PATENT DOCUMENTS

KR   2002031464 A     1/2002
KR   20050035460      4/2005
(Continued)

OTHER PUBLICATIONS

Extended European Search Report in European Application No. 19159941.4, dated Jul. 24, 2019, 13 pages.
(Continued)

*Primary Examiner* — Steve S Tanenbaum
(74) *Attorney, Agent, or Firm* — Fish & Richardson P.C.

(57) ABSTRACT

A refrigerator includes: a cabinet including a freezing chamber; an evaporator located at one side of the freezing chamber; a freezing chamber fan configured to supply cool air to the freezing chamber; an ice maker located in the freezing chamber and configured to perform ice-making; an ice bin located below the ice maker and separates and stores ice made in the ice maker; an ice detection device which detects whether or not the ice stored in the ice bin is full; and a control unit configured to control the freezing chamber fan according to a detection signal of the ice detection device.
(Continued)

The control unit is configured to turn off the freezing chamber fan when ice-fullness is detected by the ice detection device and turn on the freezing chamber fan when the ice-fullness is not detected by the ice detection device.

20 Claims, 7 Drawing Sheets

(51) Int. Cl.
*F25D 11/02* (2006.01)
*F25C 5/187* (2018.01)
*F25D 29/00* (2006.01)
*F25D 23/04* (2006.01)
*F25D 17/06* (2006.01)

(52) U.S. Cl.
CPC ......... *F25D 17/065* (2013.01); *F25D 17/067* (2013.01); *F25D 23/04* (2013.01); *F25D 29/00* (2013.01); *F25B 2600/0253* (2013.01); *F25C 2400/10* (2013.01); *F25C 2600/04* (2013.01); *F25C 2700/02* (2013.01); *F25D 2317/068* (2013.01); *F25D 2700/122* (2013.01)

(58) Field of Classification Search
CPC ............. F25D 17/067; F25D 2700/122; F25D 2317/068; F25B 2600/0253
USPC ..................................................... 62/344, 66
See application file for complete search history.

(56) References Cited

U.S. PATENT DOCUMENTS

| 2008/0148745 | A1 | 6/2008 | Zhang et al. |
| 2010/0125365 | A1* | 5/2010 | Ahn ........................ F25D 29/00 700/275 |
| 2014/0165632 | A1 | 6/2014 | Abbasi et al. |
| 2014/0202197 | A1 | 7/2014 | Anselmino et al. |

FOREIGN PATENT DOCUMENTS

| KR | 100809749 B1 | 3/2008 |
| KR | 20080054983 | 6/2008 |
| KR | 100842388 B1 | 7/2008 |
| KR | 101451658 B1 | 10/2014 |
| KR | 101770467 | 8/2017 |

OTHER PUBLICATIONS

Office Action in Korean Appln. No. 10-2018-0024696, dated Apr. 15, 2022, 12 pages (with English translation).
Notice of Allowance in Korean Appln. No. 20180024696, dated Oct. 25, 2022, 10 pages (with Machine Translation).

* cited by examiner

FIG. 7

| CLASSIFICATION | | COMPARATIVE EXAMPLE | EXAMPLE |
|---|---|---|---|
| HEAT TRANSFER AREA (m2) | | 0.0102 | 0.0102 |
| HEAT TRANSFER AMOUNT | fan on (FORCED CONVECTION (W)) | 4.2 | 4.4 |
| | fan off (RADIANT COOLING (W)) | 2.2 | 2.2 |
| TIME OF ONE ICE-MAKING (s) | | 9996.6 | 8127 |
| NUMBER OF TIME OF ONE DAY ICE-MAKING | | 8.6 | 10.6 |
| ICE-MAKING AMOUNT (lb/day) | | 1.5243 | 1.875 |
| ONE DAY ICE-MAKING AMOUNT IMPROVING RATE (%) | | 23 | |

REFRIGERATOR AND CONTROL METHOD THEREOF

CROSS-REFERENCE TO RELATED APPLICATIONS

The present application is a continuation of U.S. application Ser. No. 16/288,745, filed on Feb. 28, 2019, which claims priority under 35 U.S.C. 119 and 35 U.S.C. 365 to Korean Patent Application No. 10-2018-0024696, filed on Feb. 28, 2018. The disclosures of the prior applications are incorporated by reference in their entirety.

BACKGROUND

The present disclosure relates to a refrigerator and a control method of a refrigerator.

A refrigerator is an appliance for storing food in a low-temperature state and has either or both of a refrigerating chamber capable of storing food in a refrigerated state and a freezing chamber capable of storing food in a frozen state.

In addition, in recent years, a dispenser is mounted on a front surface of a refrigerator door so that the user can take the drinking water through the dispenser without opening the refrigerator door.

In addition, an ice maker (ice-making device) for making and storing ice may be provided in the door or in the storage space of the refrigerator, and the ice can be taken out through the dispenser.

In the ice maker, an automatic ice maker which detects the amount of stored ice to perform water supply, ice-making, and ice-separating has developed. In addition, the ice stored by the automatic ice maker can be taken out through the dispenser.

Representatively, in Korean Patent No. 10-1770467, a freezing chamber fan is operated according to a temperature sensor mounted inside a freezing chamber to cool the freezing chamber, and at this time, the ice-making is performed in the ice-making device provided in the freezing chamber.

Therefore, in a state where the ice-making of the ice-making device is not completed, in a case where the temperature in the freezing chamber is satisfied, the freezing chamber fan is turned off and, in such a state, the ice-making cannot be effectively performed.

So as to prevent such a problem, in a case where a fan for blowing air to the ice-making device is further provided, there is a problem that the manufacturing cost increases and the power consumption increases.

SUMMARY

An objective of the present disclosure is to provide a refrigerator which can shorten an ice-making time and thereby increase a daily ice-making amount, and a control method of a refrigerator.

An objective of the present disclosure is to provide a refrigerator which can increase an ice-making amount by changing ice-making logic, not a structure, and a control method of a refrigerator.

In the refrigerator according to the present disclosure, only one freezing chamber fan is provided in the freezing chamber, a control unit can turn on the freezing chamber fan when an ice detection device does not detect ice-fullness prior to the temperature of the freezing chamber and turn off the freezing chamber fan when the ice detection device detects ice-fullness.

In a case where the temperature of the freezing chamber is equal to or less than a predetermined temperature after ice-fullness detection, the freezing fan can be turned on.

When the ice-fullness is detected, the freezing fan can rotate at a speed lower than the maximum rotation speed of the freezing chamber fan.

According to an embodiment of the present disclosure, there is provided a refrigerator including a cabinet which includes a freezing chamber; an evaporator which is provided at one side of the freezing chamber; a freezing chamber fan which supplies cool air generated in the evaporator to the inside of the freezing chamber; an ice maker which is provided in the inner region of the freezing chamber and performs ice-making by cool air supplied by the freezing chamber fan; an ice bin which is provided below the ice maker and separates and stores ice made in the ice maker; an ice detection device which detects whether or not the ice stored in the ice bin is full; and a control unit which controls the driving of the freezing chamber fan according to a detection signal of the ice detection device, in which the control unit turns off the freezing chamber fan in a case where ice-fullness is detected by the ice detection device and turns on the freezing chamber fan in a case where the ice-fullness is not detected by the ice detection device.

In a case where the ice-fullness is not detected by the ice detection device, the control unit may rotate the freezing chamber fan at a predetermined medium speed.

The medium speed may be a speed in a range between a speed higher by 30% than the predetermined minimum rotation speed of the freezing chamber fan and a speed lower by 30% than the predetermined maximum rotation speed of the freezing chamber fan.

The speed of the freezing chamber fan may be varied according to the temperature inside the freezing chamber detected by a temperature sensor in the refrigerator.

The medium speed may be any arbitrary speed between the predetermined minimum rotation speed and the predetermined maximum rotation speed of the freezing chamber fan.

The control unit may control the operation so that the frequency of an inverter compressor varies according to the load of the freezing chamber.

The control unit may turn on/off the freezing chamber fan according to a detecting signal of the ice detection device prior to the temperature in the freezing chamber detected by the temperature sensor in the refrigerator.

The control unit detects the freezing chamber temperature through a temperature sensor in the refrigerator which measures the temperature of the freezing chamber when the ice-fullness is detected by the ice detection device, and thus can turn on the freezing chamber fan in a case where the freezing chamber temperature is equal to or higher than a predetermined temperature and turn off the freezing chamber fan in a case where the freezing chamber temperature is equal to or lower than the predetermined temperature.

In a case where the ice-fullness is detected by the ice detection device and the temperature of the freezing chamber is equal to or higher than the predetermined temperature, the control unit can vary the speed of the freezing chamber fan according to the load of the freezing chamber.

The control unit may rotate at a speed lower than the maximum rotation speed of the freezing chamber fan, in a case where the ice-fullness is not detected by the ice detection device.

The freezing chamber fan is provided inside a grill pan for shielding the evaporator, and the grill pan is provided with a discharge port which discharges cool air to the freezing chamber and an opening which discharges cool air to the ice maker.

According to an embodiment of the present disclosure, there is provided a control method of a refrigerator which includes a cabinet which includes a freezing chamber; an evaporator which is provided at one side of the freezing chamber; a freezing chamber fan which supplies cool air generated in the evaporator to the inside of the freezing chamber; an ice maker which is provided in the inner region of the freezing chamber and performs ice-making by cool air supplied by the freezing chamber fan; an ice bin which is provided below the ice maker and separates and stores ice made in the ice maker; an ice detection device which detects whether or not the ice stored in the ice bin is full; and a control unit which controls the driving of the freezing chamber fan, the method including: detecting ice-fullness; [S120] turning on a freezing chamber fan to supply cold air to the freezing chamber and the ice maker in a case where the ice-fullness state is not determined; [S130] detecting the temperature of the freezing chamber by a temperature sensor in the refrigerator in a case where the ice-fullness state is determined; [S140] maintaining the freezing chamber fan in an on-state in a case where the temperature of the freezing chamber is equal to or higher than a predetermined temperature; [S150] turning off the freezing chamber fan in a case where the temperature of the freezing chamber is equal to lower than the predetermined temperature. [S160]

In step S140, the operation of the freezing chamber fan can be maintained at a medium speed.

In step S150, the freezing chamber fan can be operated at a variable speed according to the load of the freezing chamber.

The rotation speed of the compressor can be variably controlled according to the load of the freezing chamber.

The following effects can be expected in the refrigerator and the control method of the refrigerator according to the embodiment of the present disclosure.

It is possible to continuously supply the cold air to the ice-making device by using the freezing chamber fan for cooling the freezing chamber, thereby shortening the ice-making time and increasing the ice-making amount accordingly.

In addition, since the driving of the freezing chamber fan for ice-making can be determined according to the control according to the temperature of the freezing chamber and whether or not the ice-fullness of the ice-making device is detected, it is possible to effectively prevent the unnecessary rise of the electric power consumption while effectively making ice.

In addition, since the cooling of the freezing chamber and the cooling of the ice-making device can be performed simultaneously by only one freezing chamber fan without adding a separate ice-making chamber fan, the ice-making performance can be improved without configuring an additional ice-making chamber fan and thus the manufacturing cost can be reduced and productivity can be improved.

BRIEF DESCRIPTION OF THE DRAWINGS

FIG. 7 is a chart comparing an ice-making amount according to the present embodiment and an ice-making amount according to a comparative example.

DETAILED DESCRIPTION

Hereinafter, a specific embodiment of the present disclosure will be described in detail with reference to the drawings. However, the present disclosure is not limited to the embodiment in which the spirit of the present disclosure is proposed, and other embodiments falling within the spirit scope of the retrograde other disclosure or the present disclosure can be easily proposed by adding, changing, deleting, or the like of the other components.

Figure 1:
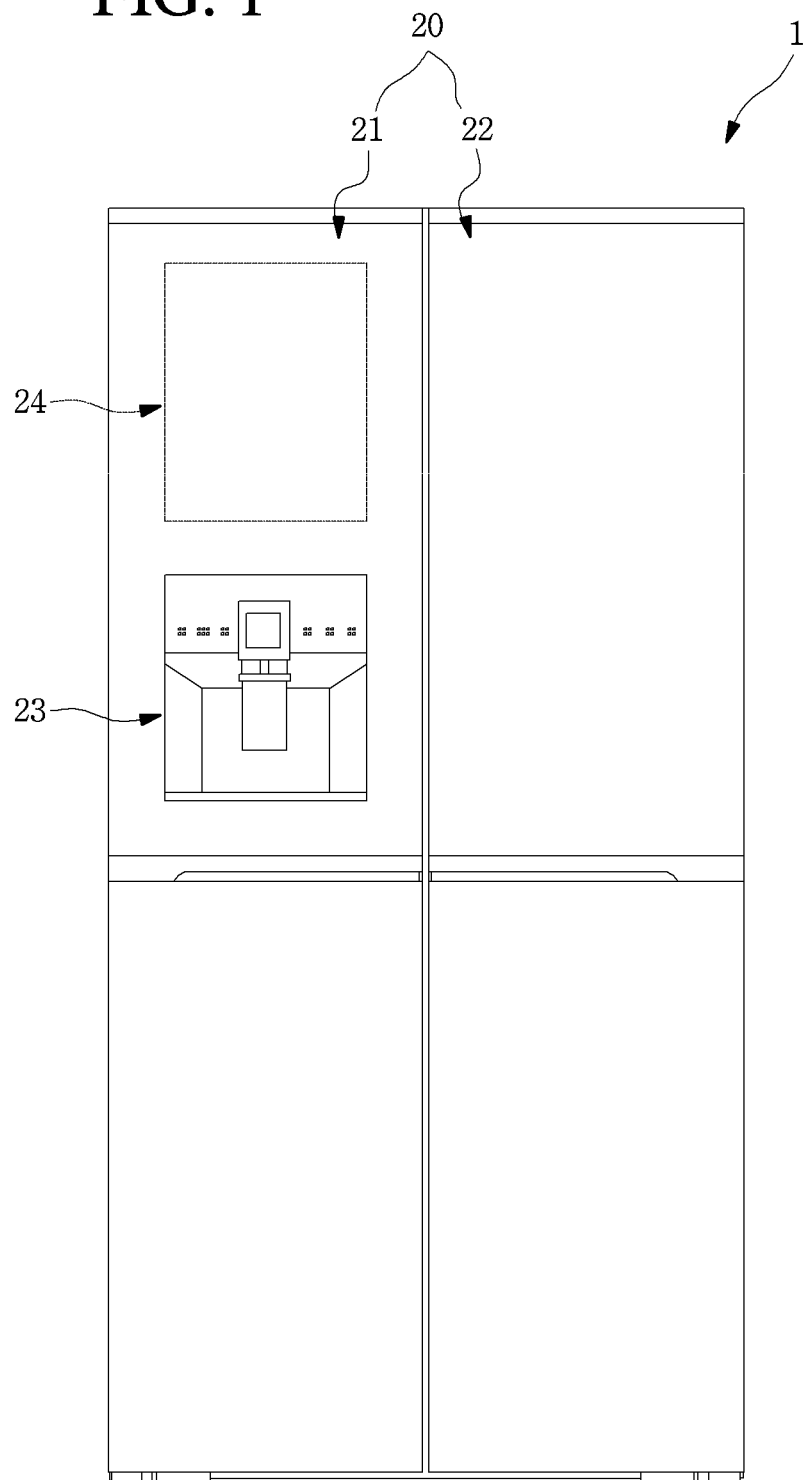
FIG. 1 is a front view illustrating a refrigerator according to an embodiment of the present disclosure.
Figure 2:
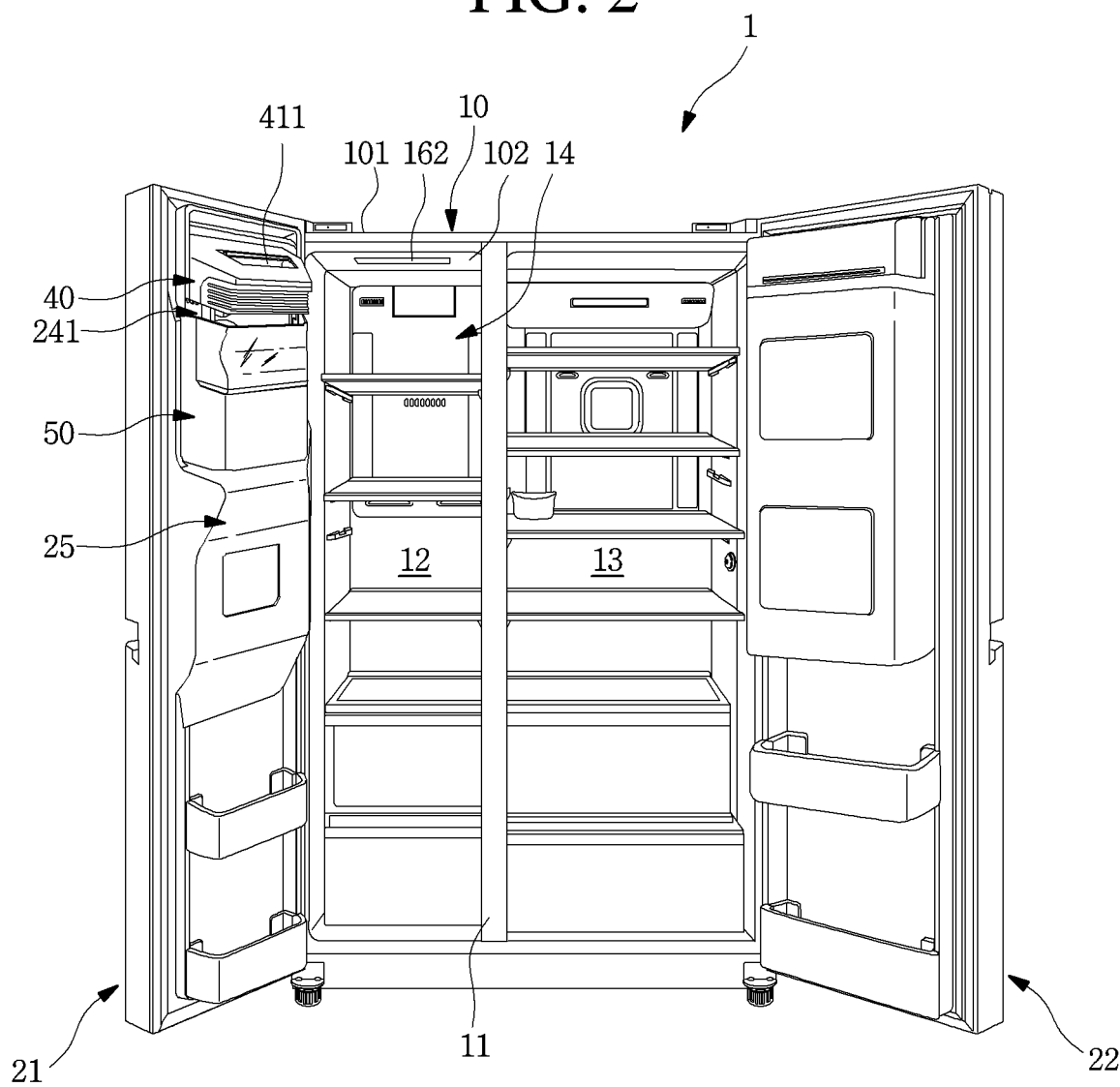
FIG. 2 is a view illustrating a state where a door of the refrigerator is opened.

FIG. 1 is a front view illustrating a refrigerator according to an embodiment of the present disclosure. In addition, FIG. 2 is a view illustrating a state where a door of the refrigerator is opened.

As illustrated in the drawings, the refrigerator 1 according to the embodiment of the present disclosure can form an outer appearance thereof by a cabinet 10 for forming a storage space and a door 20 for opening and closing a storage space of the cabinet 10.

For ease of explanation and understanding, hereinafter, a direction in which the door 20 is disposed in the refrigerator 1 is defined as a front direction, a direction in which the cabinet 10 which is shielded by the door 20 is displaced is defined as a rear direction, a direction toward the paper surface is defined as a lower direction, and a direction toward a direction opposite to the paper surface is defined as an upper direction.

The cabinet 10 may include an outer case 101 which is made of a metal material and forms an outer surface; and an inner case 102 which is made of a resin material, is coupled with the outer case 101, and forms a storage space in the refrigerator 1. In addition, a heat insulating material 103 is filled between the outer case 101 and the inner case 102 to insulate the space inside the refrigerator.

The storage space is divided into the left and right with respect to a barrier 11 and may include a left freezing chamber 12 and a left refrigerating chamber 13. In addition, the freezing chamber 12 and the refrigerating chamber 13 formed by the inner case 102 may be provided with a plurality of shelves and drawers to independently provide a space for storing food.

The door 20 may include a refrigerating chamber door 22 and a freezing chamber door 21 which independently open and close the refrigerating chamber 13 and the freezing chamber 12, respectively. The refrigerator chamber door 21 and the freezing chamber door 22 are both rotatable to open and close the refrigerator chamber 13 and the freezing chamber 12 and, to this end, both refrigerating chamber door 21 and the freezing chamber door 22 can be pivotally connected to the cabinet 10 by a hinge device.

A pair of the freezing chamber doors 22 may be provided with a dispenser 23 and an ice-making unit 24. In addition, the dispenser 23 and the ice-making unit 24 may be configured to communicate with each other by an ice chute 25. The ice-making unit 24 may include at least the ice maker 60 and an ice cover 40 and may further include at least one of the ice bin 50 and a seating member 30 as needed.

The dispenser 23 is provided on the front surface of the freezing chamber door 22 and can be configured to take out water or ice by a user's operation from the outside. In addition, the ice-making unit 24 may be provided on the rear surface of the freezing chamber door 22. The ice-making unit 24 is configured to make and store ice and may be disposed above the dispenser 23. In addition, the ice-making unit 24 may communicate with the dispenser by the ice chute 25. Therefore, during operation of the dispenser 23, the ice inside the ice-making unit 24 is supplied to the dispenser 23 through the ice chute 25 and can be taken out from the outside.

The ice-making unit 24 can make and store ice by indirect cooling using cool air of the freezing chamber 12 in addition to cold air directly supplied from the evaporator 151 for cooling the freezing chamber 12.

Particularly, in a state where the freezing chamber door 22 is closed since a cover inlet 411 of the ice-making unit 24 and a duct outlet 162 inside the cabinet 10 are adjacent to each other, it is possible to directly supply cold air to the inside of the ice-making unit 24.

Figure 3:
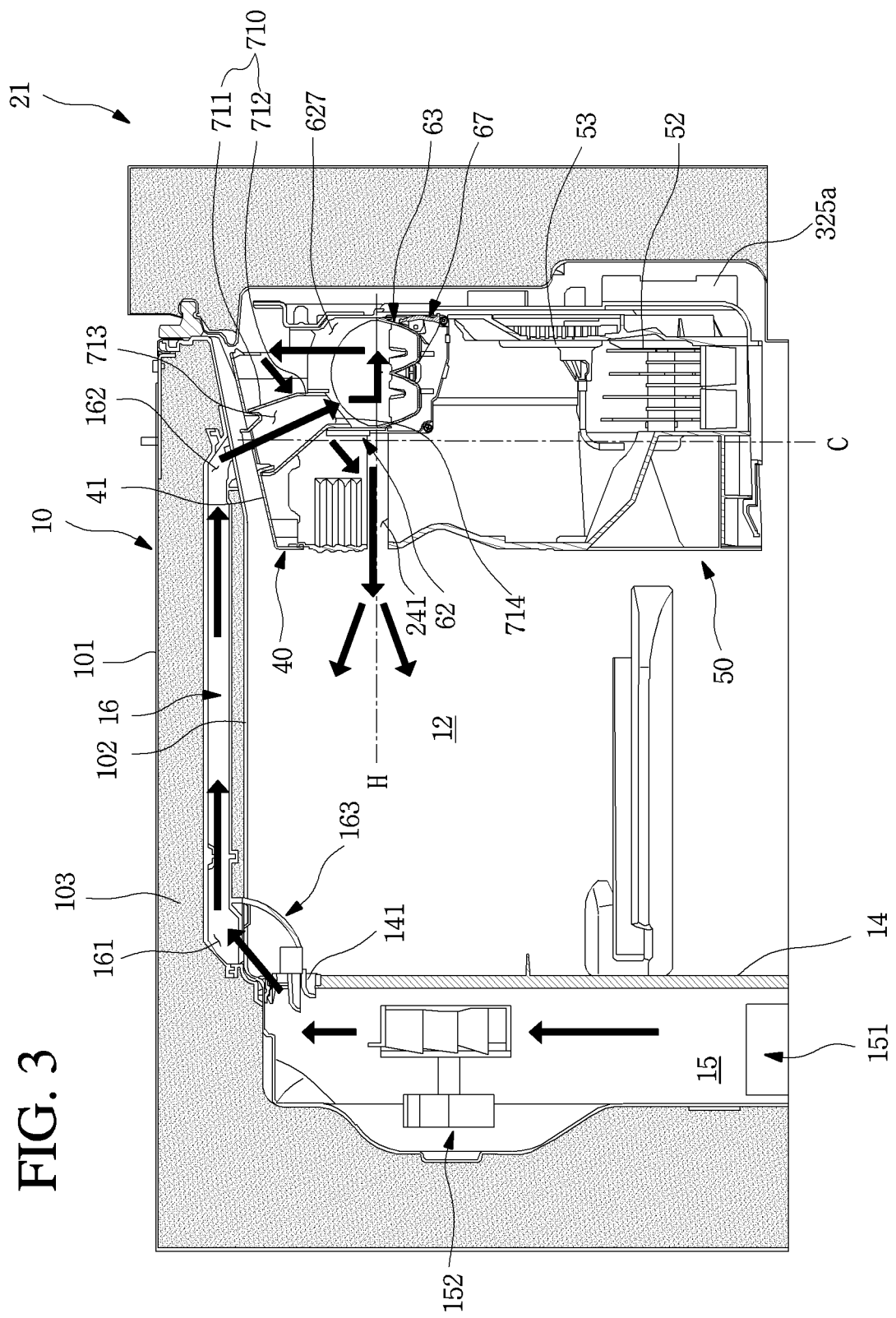
FIG. 3 is a sectional view illustrating the refrigerator.

FIG. 3 is a sectional view illustrating the refrigerator.

As illustrated in the drawing, a grill pan 14 is provided on the rear surface of the freezing chamber 12 and a heat exchange chamber 15 in which the freezing chamber 12 and the evaporator 151 are accommodated can be divided by the grill pan 14.

The grill pan 14 is provided with a plurality of discharge ports 141 for discharging cool air into the freezing chamber 12 and a suction port (not illustrated) for flowing the heat-exchanged air in the freezing chamber 12 into the heat exchange chamber 15 may be formed. Some of the plurality of discharge ports 141 may be disposed on the upper portion of the grill pan 14. In addition, the suction port may be disposed below the grill pan 14 so as to allow circulation of cool air through the entire interior of the freezing chamber 12.

The evaporator 151 and the freezing chamber fan 152 may be provided inside the heat exchange chamber 15. The cool air generated in the evaporator 151 by the rotation of the freezing chamber fan 152 is supplied to the freezing chamber 12 through the discharge port 141 and the heat-exchanged air in the freezing chamber 12 can flow into the heat exchange chamber 15 through the suction pipe. The freezing chamber 12 can be cooled to a predetermined temperature by circulating cool air by the driving of the freezing chamber fan 152.

The on/off operation of the freezing chamber fan 152 can be controlled by the control unit 80 according to whether or not the ice detection device 67 of the ice maker 60 detects the ice-fullness. The operation of the freezing chamber fan 152 will be described in more detail below.

Meanwhile, a cabinet duct 16 may be provided above the freezing chamber 12. The cabinet duct 16 is provided between the inner case 102 and the outer case 101 which form the upper surface of the freezing chamber 12 and may be disposed in a state of being buried by the heat insulating material 103.

Of course, it is also possible to have a structure in which the cabinet duct 16 is not provided and the air is blown toward the ice maker 60 through the discharge port 141, but it is possible to supply cold air more intensively through the cool air supply via the cabinet duct 16, thereby improving the ice-making efficiency.

The cabinet duct 16 extends in a front and rear direction, and a duct inlet 161 and a duct outlet 162 may be formed at the front and rear ends of the cabinet duct 16, respectively.

The duct outlet 162 is exposed on the upper surface of the freezing chamber 12 and may be formed at an inclined front end of the upper surface of the freezing chamber 12. The duct outlet 162 may be formed at a position corresponding to the cover inlet 411 of the ice-making unit 24. Therefore, in a state where the freezing chamber door 22 is closed, all the cool air supplied through the cabinet duct 16 can flow into the ice-making unit through the cover inlet 411.

The duct inlet 161 may communicate with the heat exchange chamber 15 and cool air generated by the evaporator 151 may flow into the duct inlet 161 when the freezing chamber fan 152 is driven. The duct inlet 161 may be positioned at a rear end of the upper surface of the freezing chamber 12. The duct inlet 161 and the discharge port 141 may communicate with each other by a duct cover 163 which communicates the discharge port 141 of the grill pan 14 and the duct inlet 161. Accordingly, the cold air in the heat exchange chamber 15 can be supplied to the cabinet duct 16 through the discharge port 141, the duct cover 163, and the duct inlet 161 in this order. Of course, the duct inlet 161 may extend to the heat exchange chamber 15 and directly communicate with the heat exchange chamber 15.

In this structure, the freezing chamber fan 152 can be operated while the ice is being made in the ice-making unit 24 to directly supply the cold air to the ice-making unit 24. In other words, the freezing chamber fan 152 is continuously driven until the ice-fullness is detected by the ice detection device 67, thereby improving the ice-making efficiency.

The cooling air may be supplied to the freezing chamber 12 and the ice-making unit 24 at the same time and a separate damper may be provided in the discharge opening 141 and/or the cabinet duct 16, and thus optional cold air supply to the freezing chamber 12 and the ice-making unit 24 may also be possible.

Meanwhile, the ice-making unit 24 can generally include an ice maker 60 which makes ice, an ice bin 50 which is disposed below the ice maker 60 to store ice, and an ice cover 40 which shields the ice maker 60 from above.

The ice maker 60 is disposed below the cover inlet 411 and may be located behind the center line C of the space inside the ice-making unit 24, that is, a space inside the ice bin 50.

In addition, the ice maker 60 may be connected to a supply duct 710 coupled to the ice cover 40. The cool air flowing into the cover inlet 411 by the supply duct 710 can flow into the ice maker 60.

Particularly, the supply duct 710 may include an extended portion 711 coupled to the ice cover 40 to communicate with the cover inlet 411, and an insertion portion 712 inserted into the front space 627 of the ice maker 60. The extended portion 711 may be formed to have a smaller cross-sectional area toward the insertion portion 712. Therefore, the cooling air can flow through the extended portion 711 smoothly and the cold air can be intensively supplied through the insertion portion 712.

The insertion portion 712 may extend vertically downward to facilitate insertion into the front space 627 and the extended portion 711 may be obliquely formed to extend so as to connect the cover inlet 411 with the end portion of the insertion portion 712 so that the cool air can flow smoothly.

In addition, an ice detection device 67 may be provided under the ice tray of the ice maker 60 and the ice detection device 67 may detect the fullness of ice accommodated in the ice bin 50.

Meanwhile, the ice bin 50 may be formed in a tubular shape in which ice made by the ice maker 60 is dropped and stored. In addition, a portion of the ice bin 50 may be formed of a transparent material through which the inside thereof can be seen.

In addition, the ice bin 50 can include an auger 53 which is rotated so as to prevent ice in the ice bin 50 from being frozen, and an ice transfer member 52 which selects the ice in the ice bin 50 as a cube state of ice and a piece state of ice and discharges. The auger 53 and the ice transfer member 52 may be connected to an ice bin motor and a gearbox provided in the freezing chamber door 21 in a state in which the ice bin 50 is mounted, and operated.

Meanwhile, an ice cover 40 may be provided above the ice bin 50. The ice cover 40 has a structure for shielding the ice maker 60 and the supply duct 710 mounted to the ice maker 60, and when the ice cover 40 is separated, at least the ice-maker 60 and the supply duct 710 can be exposed.

The ice cover 40 forms an outer appearance of the upper portion of the ice-making unit 24 and the upper surface 40 of the ice cover 40 can be formed to have an inclination corresponding to the front end of the upper surface of the freezing chamber 12. In addition, a cover inlet 411 through which cool air discharged from the cabinet duct 16 flows may be formed on an upper surface 41 of the ice cover 40. In addition, the inner surface of the ice cover 40 may be formed with a protrusion which can be coupled with the supply duct 710 disposed so as to communicate with the cover inlet 411.

Meanwhile, the ice cover 40 and the ice bin 50 may be spaced apart from each other and a space spaced apart between the ice cover 40 and the ice bin 50 can be positioned at a position corresponding to the height H of the upper surface of the ice tray 63. Therefore, the cool air supplied for the ice-making is heat-exchanged with the water at the upper surface of the ice tray 63 and then most of the cool air can flow outside the ice bin 50 through the space between the ice cover 40 and the ice bin 50 without being supplied to the inner lower portion of the ice bin 50. Therefore, it is possible to prevent the surface of the ice in the ice bin 50 from being melted and frozen by the supplied air.

Figure 4:
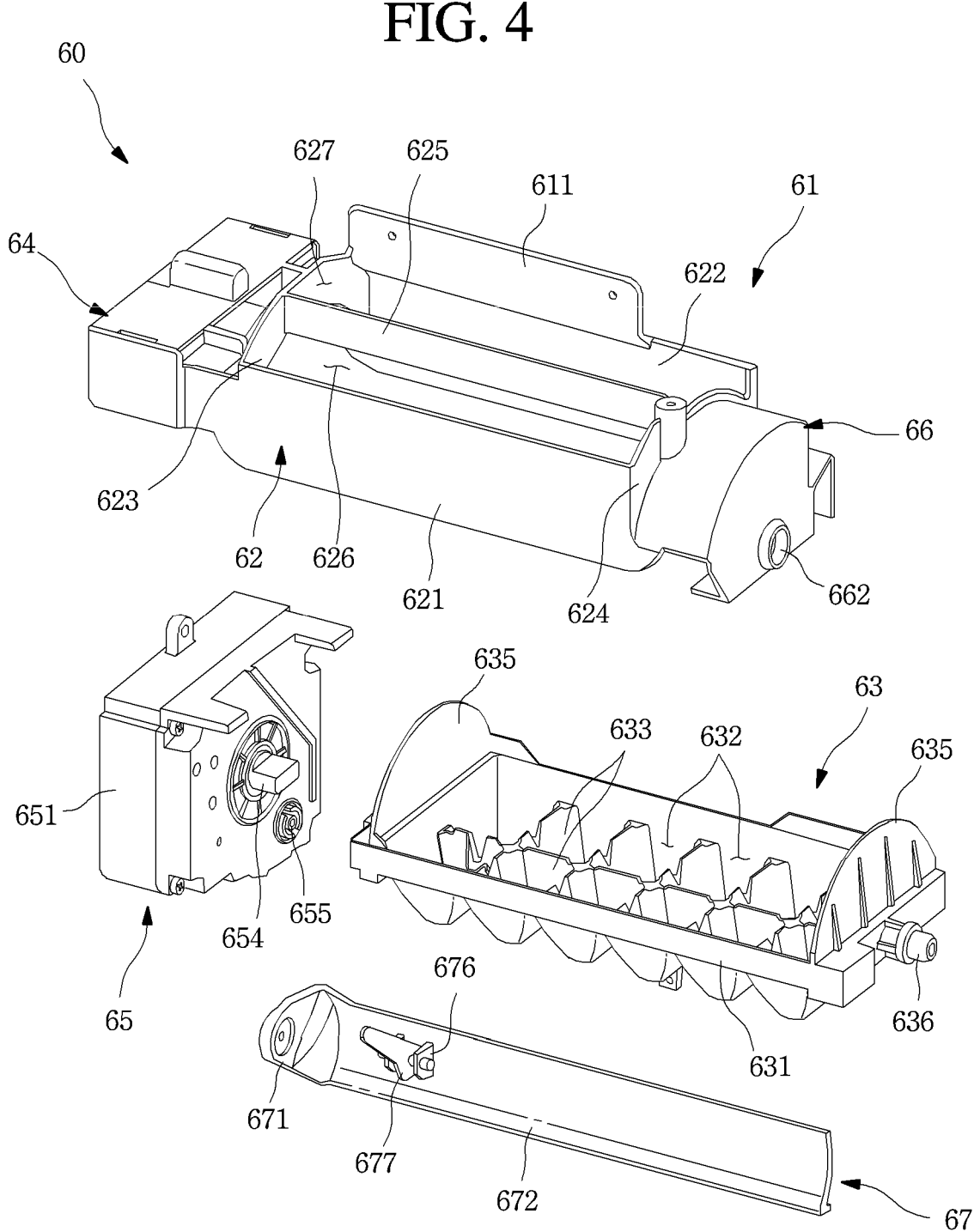
FIG. 4 is an exploded perspective view illustrating an ice maker according to an embodiment of the present disclosure.

FIG. 4 is an exploded perspective view illustrating an ice maker according to an embodiment of the present disclosure.

As illustrated in the drawing, the ice maker 60 may generally include a mounting bracket 61 for mounting the ice maker 60, a drive unit 65 for providing power for driving the ice maker 60, an ice tray 63 connected to the driving unit 65 to receive water for making ice, and an ice detection device 67 connected to the driving unit 65 to detect whether or not the ice stored in the ice bin 50 is full.

The mounting bracket 61 allows the ice maker 60 to be fixedly mounted on the seating member 30. In addition, the mounting bracket 61 provides a structure in which the driving unit 65 and the ice tray 63 can be mounted and at the same time has a structure which guides the cool air for ice-making and prevents the water accommodated in the ice tray 63 from being splashed and overflowing.

The mounting bracket 61 may include a tray accommodating portion 62 in which the ice tray 63 is accommodated, a mounting portion 611 which extends from the front end of the tray accommodating portion 62 and is fixed to and mounted on the ice maker 60, and a driving unit mounting portion 64 to which the driving unit 65 is mounted, and an shaft coupling portion 66.

The driving unit 65 provides power for rotating the ice tray 63 and the ice detection device 67 and may be mounted on one side of the left and right sides of the mounting bracket 61. A driving shaft 654 which is coupled to the ice tray 63 and a detecting device rotation shaft 655 which is coupled to the ice detection device 67 may be provided on one side surface of the driving unit 65. Therefore, the ice tray 63 and the ice detection device 67 can be rotated by the operation of the driving unit 65.

The ice tray 63 receives water for ice-making and may be formed a resin material of a plastic material. One end of the ice tray 63 is axially coupled to the driving unit 65 and thus the ice tray 63 can be rotated. In addition, in the ice tray 63, a plurality of cells 632 may be divided by a partition 633, and cells 632 of the same size may be continuously disposed in two rows as illustrated.

In addition, an edge portion 631 may be formed on the upper end of the ice tray 63. The edge portion 631 forms the periphery of the upper end of the ice tray 63 and is in close contact with the lower end of the tray accommodating portion 62 of the mounting bracket 61 to prevent water from overflowing.

Meanwhile, the tray rotation shaft 636 is provided at the center of both left and right ends of the edge portion 631. In addition, one side of the tray rotation shaft 636 is coupled to the driving shaft 654 of the driving unit 65 and the other side of the tray rotation shaft 636 is coupled to the rotation shaft hole 662 of the shaft coupling portion 66 so that the ice tray 63 can be rotatably mounted.

In addition, a semicircular shielding plate 635 extending upward can be formed on both left and right sides of the upper surface of the edge portion 631. The shielding plate 635 is accommodated in the tray accommodating portion 62 and shields surfaces opened on both left and right sides of the upper side of the ice tray 63. Accordingly, in a state where the ice tray 63 is positioned in the tray accommodating portion 62, the front, rear, left, and right sides of the upper side of the ice tray 63 can be all shielded by an accommodating portion front surface 622 and an accommodating portion rear surface 621 of the tray accommodating portion 62. This structure prevents the water supplied to the ice tray 63 from overflowing to the outside so that the cool air supplied to the upper side of the ice tray 63 does not pass downward through the ice tray 63 and can be circulated from the upper side of the ice tray 63.

Meanwhile, the mounting bracket 61 may include the tray accommodating portion 62. The tray accommodating portion 62 may be formed along the periphery of the ice tray 63 and may be formed as a frame capable of accommodating the ice tray 63 therein. The tray accommodating portion 62 may extend upward from the upper end of the ice tray 63, and particularly, the accommodating portion front surface 622 and the accommodating portion rear surface 621 may extend upwardly while being in contact with the front end and the rear end of the edge portion 631 of the ice tray 63. Therefore, it is possible to prevent water from overflowing in the front and rear direction inside the ice tray 63. In addition, the tray accommodating portion 62 is formed to have a predetermined height to prevent water from overflowing and to form a circulation space for the cool air.

Meanwhile, rounded openings corresponding so as to accommodate the shielding plate 635 may be formed on both side surfaces of the tray accommodating portion 62. In addition, an accommodating portion side surface 623 connecting the accommodating portion front surface 622 and the accommodating portion rear surface 621 may be formed above the opening. The accommodating portion side surface 623 is formed by vertically outwardly bending a guide surface 623a which is in contact with an outer end of the shielding plate 635 to guide the rotation of the ice tray 63.

In addition, a dividing portion 625 may be formed between the accommodating portion side surfaces 623. The dividing portion 625 is formed so as to divide the space of the tray accommodating portion 62 in the front and rear direction, and both ends thereof are formed so as to be in contact with the accommodating portion side surface 623. The height of the dividing portion 625 in the vertical direction is formed to a size corresponding to the accommodating portion side surface 623 and divides a space above the tray so that the cool air supplied to the ice tray 63 and the cool air discharged to the outside of the ice tray 63 can flow with a directivity. At this time, the length of the dividing portion 625 may have a length in a vertical direction which does not interfere with the ice tray 63 when the ice tray 63 rotates.

The space of the tray accommodating portion 62 may be divided into a front space 627 and a rear space 626 based on the dividing portion 625. In addition, the rear space 626 may have a size corresponding so that a lower end of the supply duct 710, that is, the insertion portion 712 can be inserted thereinto. Therefore, the rear space 626 may be an inlet through which cool air is supplied to the upper surface of the ice tray 63 and the front space 627 may be an outlet through which the heat-exchanged air from the upper surface of the ice tray 63 is discharged to the outside of the ice maker 60. Accordingly, the rear space 266 may be referred to as an inflow space, and the front space 267 may be referred to as an outflow space. Of course, in a case where cold air flows into the front space 267, the front space 267 may be an inflow space and the rear space 266 may be an outflow space.

Due to such a structure, the cool air supplied to the upper surface of the ice tray 63 by the supply duct 710 is heat-exchanged with the water filled in the ice tray 63, and then effectively flows to the outside of the tray accommodating portion 62 through the front space 629, and thus the present disclosure has an effective circulation structure of cold air.

The ice detection device 67 may be axially coupled to the detecting device rotation shaft 655 and rotate. The ice detection device 67 does not protrude in the front and rear direction of the ice maker 60 in a standby state or in an operating state, and in the operating state, whether or not ice is full can be detected effectively while passing the ice-fullness height in which ice is stacked below the ice tray 63.

In some examples, the ice detection device 67 may correspond to an ice detector or an ice detection device that is configured to detect an amount of the one or more ice pieces stored in the ice bin and that is configured to generate a detection signal based on whether the amount of the one or more ice pieces in the ice bin is greater than or equal to a threshold amount.

The ice detection device 67 may be formed in a bent plate shape having a predetermined width as a whole. In other words, the ice detection device 67 may include a connection portion 671 and a detecting portion 672 which are bent in directions intersecting with each other.

The connection portion 671 forms one end of the ice detection device 67 and may be connected to the detecting device rotation shaft 655. The detecting portion 672 is bent vertically at an extended end portion of the connection portion 671.

The detecting portion 672 may be formed in a plate shape having the same width as the lower end of the connection portion 671 and may extend from one end of the connection portion 671 to the extended other end of the ice tray 63. Therefore, it is possible to be configured so as to detect all whether or not ice is full at a region in which the ice tray 63 is disposed. In addition, the detecting portion 672 may be formed so as to have a predetermined width so as not to interfere with the rotation of the ice tray 63 in the standby state.

Meanwhile, a freezing release member 677 may be provided on one side of the inner surface of the detecting portion 672. By the freezing release member, the ice detection device 67 can be released from the frozen state by the rotation of the ice tray 63 when the shaft of the ice detection device 67 is not operated by frozen. The freezing-release member 677 may be disposed between a pair of mounting portions 676 extending from the inner surface of the detecting portion 672.

The ice detection device 67 may have various structures such as a wire type, a lever type which is vertically moved, an infrared ray sensor, a weight detection sensor, or the like, in addition to the structure as in the embodiment described above.

In other words, the present disclosure is not limited to the structure of the ice maker 60 and the structure of the ice detection device 67 but may be applied to all types of refrigerators equipped with the ice detection device.

Hereinafter, the operation of the refrigerator having the above structure will be described.

Figure 5:
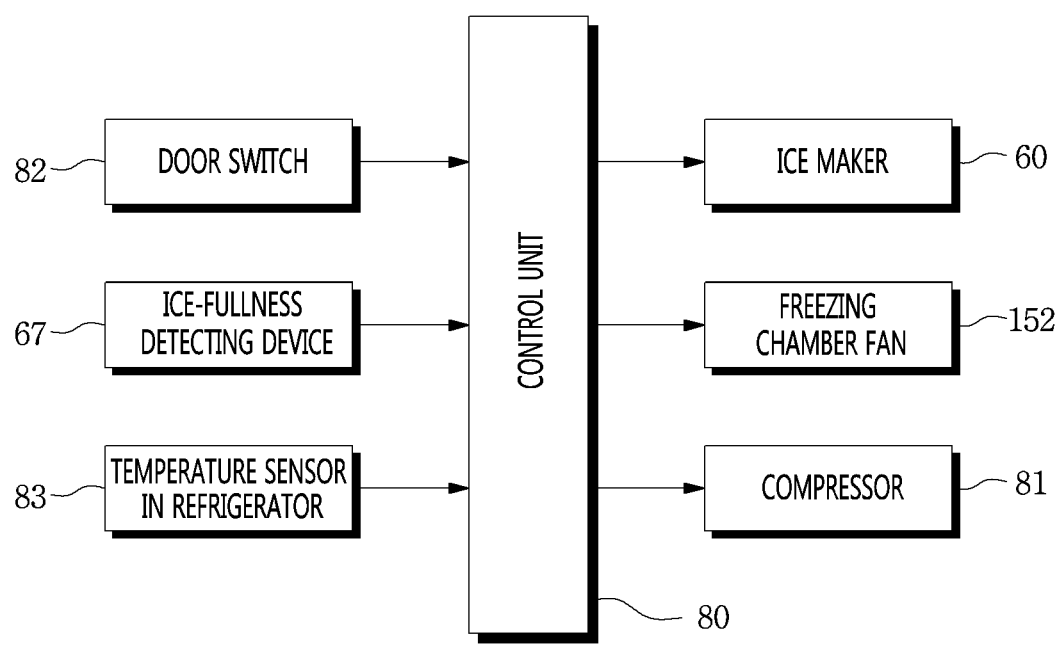
FIG. 5 is a block diagram illustrating a control signal flow of the refrigerator.
Figure 6:
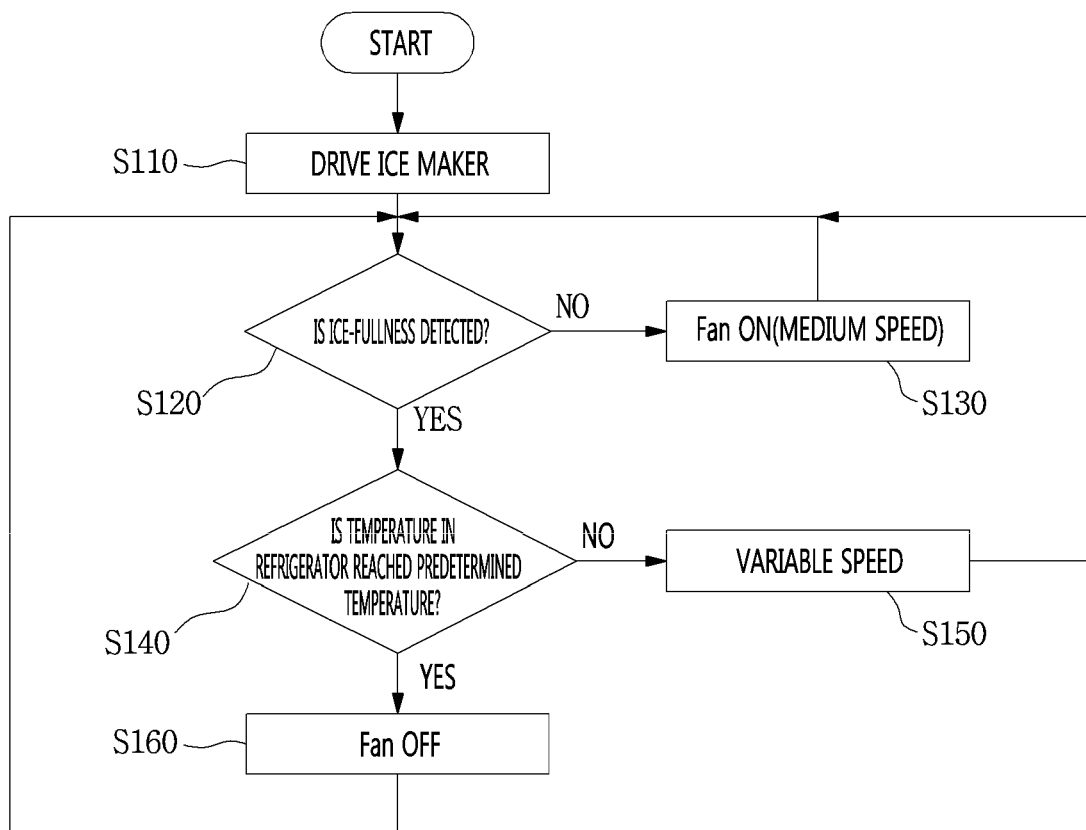
FIG. 6 is a flowchart sequentially illustrating the operation of the refrigerator.

FIG. 5 is a block diagram illustrating a control signal flow of the refrigerator. In addition, FIG. 6 is a flowchart sequentially illustrating the operation of the refrigerator.

As illustrated in the drawings, when the operation of the refrigerator 1 is started, the control unit 80 may control the derive of the compressor 81 and the freezing chamber fan 152, and the freezing of the freezing chamber 12 and the ice-making of the ice maker 60 can be performed by the cool air supplied by the freezing chamber fan 152.

Meanwhile, the ice maker 60 may be driven under the control of the control unit 80, and the ice maker 60 may repeatedly perform water supply, ice-making, and ice-separating. In addition, the ice made in the ice maker 60 may be supplied to the inside of the ice bin 50 and stored therein. [S110]

While the ice maker 60 continues to perform ice-making, the ice detection device 67 is operated to detect whether or not in a state where the ice in the ice bin 50 is full. The ice detection device 67 detects the amount of ice stored in the ice bin 50 and when ice is full in the inner portion of the ice bin 50, the ice-fullness signal is transmitted to the control unit 80 and the water supply and the ice-separating to the ice maker 60 can be stopped. In addition, the ice maker 60 continuously repeats the ice-making and ice-separating until the ice-fullness is detected by the ice detection device 67.

The ice detection device 67 may be periodically operated by the control unit 80 or may be operated in conjunction with the ice-making operation of the ice tray 63. Of course, the ice detection device may be configured to continuously detect the ice-fullness of the ice bin according to the structure of the ice detection device. [S120]

Meanwhile, when the detection signal is not transmitted from the ice detection device 67 to the control unit 80, the control unit 80 determines that the ice is not full, and the freezing chamber fan 152 may be turned on or be maintained in a state of being turned on so that the continuous ice-making is performed in the ice maker 60. In other words, the control unit continuously rotates the freezing chamber fan 152 to continuously supply cool air to the side of the ice maker 60 to continuously make ice on the side of the ice maker 60 and to separate ice, so that the ice can be stored in the bin 50.

Of course, at this time, the supply of cold air to the side of the freezing chamber 12 can be also continuously performed, and the additional cooling by the continuous cool air supply to the freezing chamber 12 and the ice maker 60 becomes possible by continuous turning on of the freezing chamber fan 152.

In addition, the control unit 80 can operate the freezing chamber fan 152 at medium speed until the ice detection device 67 transmits a detection signal (e.g., an ice-fullness detecting signal). In this case, the medium speed is a speed at which the freezing chamber fan 152 is suitable for the ice-making and does not suddenly super-cool down the freezing chamber, and does not mean exactly the middle of the highest and lowest speeds of the freezing chamber fan 152 arithmetically. The operation of the freezing chamber fan 152 at a medium speed may mean that the freezing chamber fan 152 is operated at a speed within a range between lower or higher by about 30% than a maximum rotation speed and a minimum rotation speed of the freezing chamber fan respectively, and the speed may be set by the user's choice as needed.

Accordingly, as the operation speed of the freezing chamber fan 152 is reduced and the refrigerating chamber fan is operated at the medium speed, the supercooling of the freezing chamber can be prevented while ice-making is possible due to a continuous supply of cold air in the ice maker 60.

Meanwhile, the operation of the compressor 81 can be operated according to the load of the freezing chamber 12. In other words, the compressor 81 can be turned on and off according to the load of the freezing chamber 12, and in a case where the compressor 81 is the inverter type compressor 81, the rotational speed can be adjusted according to the load. Accordingly, since the freezing chamber fan 452 is always turned on during the ice-making, and forced convection occurs due to the remaining cold air of the evaporator 151 and the air volume of the freezing chamber fan 152, the water inside the ice maker 60 can be cooled more quickly. [S130]

Meanwhile, when the ice-fullness signal is detected by the ice detection device 67, the temperature sensor 83 in the refrigerator determines whether or not the inside of the freezing chamber 12 has reached the predetermined temperature. In a case where the internal temperature of the freezing chamber 12 is not satisfied even if the ice bin is in the ice-fullness state, the temperature of the freezing chamber 12 can be checked after the ice-fullness detection by the ice detection device 67 so that the side inside the refrigerator can be further cooled. [S140]

In a case where the temperature of the freezing chamber 12 detected by the temperature sensor 83 in the refrigerator does not reach the predetermined temperature, that is, in a case where the temperature of the freezing chamber 12 is equal to or higher than the predetermined temperature, the freezing chamber fan 152 is maintained in the on state under the control of the control unit 80.

At this time, the freezing chamber fan 152 may vary in speed according to the temperature of the freezing chamber 12 to be detected. For example, in a case where the temperature of the freezing chamber 12 is equal to or higher than the predetermined temperature and the difference is equal to or greater than the predetermined size, the rotation speed of the freezing chamber fan 152 can be controlled more quickly by the control unit 80. In addition, the rotation speed of the freezing chamber fan 152 can be controlled to be relatively slower by the control unit 80 in a case where the temperature of the freezing chamber 12 is equal to or higher than the predetermined temperature and the difference is equal to or less than the predetermined size. In addition, the rotation speed of the freezing chamber fan 152 may vary linearly according to the temperature of the freezing chamber 12. [S150]

On the other hand, in a case where the temperature of the freezing chamber 12 detected by the temperature sensor 83 in the refrigerator reaches the predetermined temperature, that is, in a case where the temperature of the freezing chamber 12 is equal to or lower than the predetermined temperature, the freezing chamber fan 152 can be turned off by the control unit.

In other words, in a case where the temperature of the freezing chamber 12 is also lowered to a temperature which is equal to or lower than the predetermined temperature and satisfied in a state of being ice-fullness by being full of ice in the ice bin 50, since the inside of the ice maker 60 and the freezing chamber 12 no longer require further cooling, the freezing chamber fan 152 is turned off and no further cooling of the freezing chamber 12 and the ice maker 60 occurs.

Meanwhile, in the present embodiment, the predetermined temperature may be a specific temperature or may be a specific temperature range. [S160]

The ice in the ice bin 50 can be taken out to the outside through the dispenser 23 in s state where the freezing chamber fan 152 is turned off by being in an ice-fullness state, and the inner portion of the ice bin 50 can be in a state of where ice is not full again. Therefore, the ice detection device 67 can be operated so as to re-detect whether or not the ice is full so that the cooling in the refrigerator and ice-making are performed again.

As described above, when the freezing chamber fan 152 is operated for the cooling in the refrigerator and for ice-making, on/off of the freezing chamber fan 152 can be determined by the ice detection device 67, and therefore the driving of the freezing chamber fan 152 optimized for ice making can be assured. In addition, the freezing chamber 12 can be cooled at the same time as the ice maker 60 performs the ice-making.

Hereinafter, the ice-making amount according to the embodiment of the present disclosure described above will be compared with the ice-making amount according to the related art (comparative example).

FIG. 7 is a chart comparing the ice-making amount according to this embodiment and the ice-making amount according to the comparative example.

As illustrated, in the related art refrigerator in which the freezing chamber fan is configured to be turned on and off only by the temperature in the refrigerator, the heat transfer amount due to the forced convection becomes relatively smaller in the same heat transfer area.

The cooling for ice-making can be performed by the cooling by the convection generated when the freezing chamber fan 152 is driven and the radiant cooling by the cold air in the refrigerator in a state where the freezing chamber fan 152 is stopped.

Therefore, in both of the comparative example and the embodiment, during the radiant cooling in which the freezing chamber fan 152 is turned off, the ice maker 60 is cooled with the same heat transfer amount to be capable of performing ice-making. On the other hand, during forced convection cooling in which the freezing chamber fan 152 is turned on, the embodiment relatively cools the ice maker 60 with a larger heat transfer amount.

In other words, in the embodiment of the present disclosure, since the on/off control of the freezing chamber fan 152 is performed according to whether or not ice is full, the time for turning on the freezing chamber fan 152 becomes longer relatively, and accordingly, the heat transfer amount transferred further increases in a state where the freezing chamber fan 152 is on, so that the ice maker 60 can be further cooled to improve the ice-making efficiency.

Accordingly, it can be seen that the ice-making time is shorter in a case of the embodiment compared to the comparative example when compared with the time of one ice-making, and thus the number of time of one day ice-making and the one day ice-making amount further increase, and overall, the one day ice-making amount improving rate is improved by 23%.

In this way, when the freezing chamber fan 152 is maintained in an on-state continuously until the ice-fullness detection of the ice detection device 67 is performed, the ice-making amount can be improved and the ice-making efficiency can be improved.

What is claimed is:

1. A refrigerator comprising:
    a cabinet that defines a freezing chamber;
    an evaporator configured to cool the freezing chamber;
    a freezing chamber fan configured to supply cool air generated by the evaporator to the freezing chamber;
    an ice maker configured to perform ice-making based on cool air supplied by the freezing chamber fan;
    an ice bin located below the ice maker and configured to store one or more ice pieces made by the ice maker;
    an ice detector that is configured to detect an amount of the one or more ice pieces stored in the ice bin and that is configured to generate a detection signal based on whether the amount of the one or more ice pieces in the ice bin is greater than or equal to a threshold amount;
    a temperature sensor configured to detect a temperature of the freezing chamber; and
    a controller configured to:
        control driving of the freezing chamber fan based on the detection signal and the detected temperature of the freezing chamber,
        operate the freezing chamber fan,
        based on the amount of the one or more ice pieces in the ice bin being greater than or equal to the threshold amount, compare the detected temperature of the freezing chamber to a reference temperature while operating the freezing chamber fan, and
        turn off the freezing chamber fan based on both (i) the amount of the one or more ice pieces in the ice bin being greater than or equal to the threshold amount and (ii) the detected temperature of the freezing chamber being less than the reference temperature.

2. The refrigerator according to claim 1,
    wherein the controller is further configured to, based on the detected temperature of the freezing chamber being greater than or equal to the reference temperature, vary a rotation speed of the freezing chamber fan.

3. The refrigerator according to claim 1,
    wherein the controller is further configured to:
        based on receiving the detection signal from the ice detector, determine the detected temperature of the freezing chamber through the temperature sensor; and
        maintain an on-state of the freezing chamber fan based on the detected temperature of the freezing chamber being greater than or equal to the reference temperature.

4. The refrigerator according to claim 1, wherein the controller is further configured to, based on the amount of the one or more ice pieces in the ice bin being less than the threshold amount, drive the freezing chamber fan to rotate at a speed that is less than a maximum rotation speed of the freezing chamber fan.

5. The refrigerator according to claim 1, further comprising a grille panel that covers the evaporator, the grille panel defining a discharge port configured to discharge cool air to the freezing chamber and an opening configured to discharge cool air to the ice maker,
    wherein the freezing chamber fan is located inside the grille panel.

6. The refrigerator according to claim 1, wherein the controller is further configured to, based on the amount of the one or more ice pieces in the ice bin being less than the threshold amount, drive the freezing chamber fan to rotate at a predetermined rotation speed.

7. The refrigerator according to claim 6, wherein the controller is further configured to drive the freezing chamber fan to rotate at a rotation speed between a minimum rotation speed and a maximum rotation speed, and
    wherein the predetermined rotation speed is between the minimum rotation speed and the maximum rotation speed of the freezing chamber fan.

8. The refrigerator according to claim 6, further comprising an inverter compressor configured to supply refrigerant to the evaporator,
    wherein the controller is further configured to control operation of the inverter compressor and to vary an operation frequency of the inverter compressor according to a load of the freezing chamber.

9. The refrigerator according to claim 6, wherein the controller is further configured to drive the freezing chamber fan to rotate at a rotation speed between a minimum rotation speed and a maximum rotation speed, and
    wherein the predetermined rotation speed is in a range between a first speed that is greater than the minimum rotation speed by 30% of the minimum rotation speed and a second speed that is less than the maximum rotation speed by 30% of the maximum rotation speed.

10. The refrigerator according to claim 9,
    wherein the controller is further configured to vary the rotation speed of the freezing chamber fan based on the detected temperature of the freezing chamber.

11. The refrigerator according to claim 10, wherein the controller is further configured to, based on (i) a reception of the detection signal from the ice detector and (ii) a determination that the detected temperature of the freezing chamber is greater than or equal to the reference temperature, vary the rotation speed of the freezing chamber fan according to a load of the freezing chamber.

12. A control method of a refrigerator, the refrigerator including a cabinet that defines a freezing chamber, an evaporator configured to cool the freezing chamber, a freezing chamber fan configured to supply cool air generated by the evaporator to the freezing chamber, an ice maker configured to perform ice-making based on cool air supplied by the freezing chamber fan, an ice bin located below the ice maker and configured to store one or more ice pieces made by the ice maker, an ice detector configured to detect an amount of the one or more ice pieces stored in the ice bin and to generate a detection signal based on the amount of the one or more ice pieces, a temperature sensor configured to detect a temperature of the freezing chamber, and a controller configured to control driving of the freezing chamber fan based on the detection signal and the detected temperature of the freezing chamber, the control method comprising:
  operating the freezing chamber fan;
  receiving the detection signal that is generated by the ice detector;
  based on the detection signal, determining whether the amount of the one or more ice pieces in the ice bin is greater than or equal to a threshold amount;
  based on a determination that the amount of the one or more ice pieces in the ice bin is greater than or equal to the threshold amount, comparing the detected temperature of the freezing chamber to a reference temperature while operating the freezing chamber fan; and
  turning off the freezing chamber fan based on both (i) the amount of the one or more ice pieces in the ice bin being greater than or equal to the threshold amount and (ii) the detected temperature of the freezing chamber being less than the reference temperature.

13. The control method according to claim 12, further comprising varying a rotation speed of a compressor of the refrigerator based on a load of the freezing chamber.

14. The control method according to claim 12, further comprising:
  based on a determination that the amount of the one or more ice pieces in the ice bin is less the threshold amount, driving the freezing chamber fan to rotate at a rotation speed that is less than a maximum rotation speed of the freezing chamber fan.

15. The control method according to claim 12, further comprising:
  determining that the amount of the one or more ice pieces in the ice bin is less than the threshold amount based on receiving no detection signal from the ice detector.

16. The control method according to claim 12, further comprising detecting an ice-fullness of the ice bin based on a predetermined period.

17. The control method according to claim 12, further comprising:
  based on a determination that the amount of the one or more ice pieces in the ice bin is greater than or equal to the threshold amount, detecting the detected temperature of the freezing chamber by the temperature sensor; and
  maintaining the freezing chamber fan in an on-state based on a detection that the detected temperature of the freezing chamber is greater or equal to the reference temperature,
  wherein maintaining the freezing chamber fan in the on-state comprises maintaining a rotation speed of the freezing chamber fan.

18. The control method according to claim 17, wherein maintaining the freezing chamber fan in the on-state comprises varying the rotation speed of the freezing chamber fan based on a load of the freezing chamber.

19. The control method according to claim 17, wherein the rotation speed of the freezing chamber fan is predetermined in a range between a minimum rotation speed and a maximum rotation speed of the freezing chamber fan.

20. The control method according to claim 19, wherein maintaining the freezing chamber fan in the on-state comprises maintaining the rotation speed of the freezing chamber fan in a range between a first speed that is greater than the minimum rotation speed by 30% of the minimum rotation speed and a second speed that is less than the maximum rotation speed by 30% of the maximum rotation speed.

* * * * *